(12) United States Patent
Strandborg et al.

(10) Patent No.: US 12,504,813 B2
(45) Date of Patent: Dec. 23, 2025

(54) EYE-DIRECTED IMAGE SIGNAL PROCESSING

(71) Applicant: Varjo Technologies Oy, Helsinki (FI)

(72) Inventors: Mikko Strandborg, Helsinki (FI); Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 313 days.

(21) Appl. No.: 18/482,364

(22) Filed: Oct. 6, 2023

(65) Prior Publication Data
US 2025/0117076 A1   Apr. 10, 2025

(51) Int. Cl.
*G06F 3/01*    (2006.01)
*G06T 5/92*    (2024.01)
*G06V 10/60*   (2022.01)
*G06V 40/18*   (2022.01)

(52) U.S. Cl.
CPC .......... *G06F 3/013* (2013.01); *G06T 5/92* (2024.01); *G06V 10/60* (2022.01); *G06V 40/193* (2022.01); *G06T 2207/10024* (2013.01)

(58) Field of Classification Search
CPC ...... G06F 3/013; G06V 10/60; G06V 40/193; G06T 5/92; G06T 2207/10024

USPC ......................................................... 382/274
See application file for complete search history.

(56) References Cited

U.S. PATENT DOCUMENTS

| | | | |
|---|---|---|---|
| 10,475,169 B2 * | 11/2019 | Sunkavalli | G06T 9/002 |
| 2019/0384063 A1 * | 12/2019 | Oliver | G02B 27/0172 |
| 2020/0311895 A1 * | 10/2020 | Sakurai | G06T 5/50 |
| 2021/0134245 A1 * | 5/2021 | Bonnier | G06V 40/193 |
| 2025/0104619 A1 * | 3/2025 | Strandborg | G09G 3/3208 |

* cited by examiner

*Primary Examiner* — Gabriel I Garcia
(74) *Attorney, Agent, or Firm* — Ziegler IP Law Group, LLC.

(57) ABSTRACT

Disclosed is a system with an image sensor comprising a plurality of photo-sensitive cells; and processor(s) configured to: receive, from the image sensor, a plurality of image signals captured by corresponding photo-sensitive cells of the image sensor; obtain information indicative of a current pupil size of a user of a display apparatus; determine a given luminosity range corresponding to the current pupil size; and selectively perform a sequence of image signal processes on the plurality of image signals and control a plurality of parameters employed for performing the sequence of image signal processes, based on the given luminosity range, to generate an image.

20 Claims, 2 Drawing Sheets

EYE-DIRECTED IMAGE SIGNAL PROCESSING

TECHNICAL FIELD

The present disclosure relates to systems incorporating eye-directed image signal processing. The present disclosure also relates to methods incorporating eye-directed image signal processing.

BACKGROUND

Nowadays, with an increase in the number of images being captured every day, there is an increased demand for image signal processing. For example, such a demand may be quite high and critical in case of evolving technologies such as extended-reality (XR). Several advancements are being made to develop techniques for image signal processing that save time and are cost-effective.

However, existing techniques for image signal processing have several limitations associated therewith. Firstly, the existing techniques for image signal processing are used to uniformly process image signals corresponding to an image (i.e. image signals corresponding to each part of the image are processed in the same manner). Thus, an entirety of the image signals corresponding to the image are invariably similarly processed for example, to achieve a uniform visual-fidelity in the image. For such uniform processing, the existing techniques require considerable processing resources, long processing time, and high computing power. In an example, the existing techniques perform all image signal processes in an image processing pipeline for generating an image, without taking into account the fact that visual quality of said image may be compromised upon performing certain image signal processes. This may only introduce or amplify visual artifacts in said image, thereby deteriorating visual experience of the user. Secondly, existing techniques are unable to cope with visual quality requirements that arise, for example, due to high-resolution, small pixel size, and high frame-rate requirements in some display devices (such as XR devices). Resultantly, image generation is performed in a sub-optimal (i.e., non-realistic and inaccurate) manner. This leads to a poor, non-immersive viewing experience for the user when these images are shown to the user.

Therefore, in light of the foregoing discussion, there exists a need to overcome the aforementioned drawbacks.

SUMMARY

The present disclosure seeks to provide a system and a method to generate high-quality and realistic output images for a display apparatus, in a computationally-efficient and a time-efficient manner. The aim of the present disclosure is achieved by a system and a method which incorporate eye-directed image signal processing, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
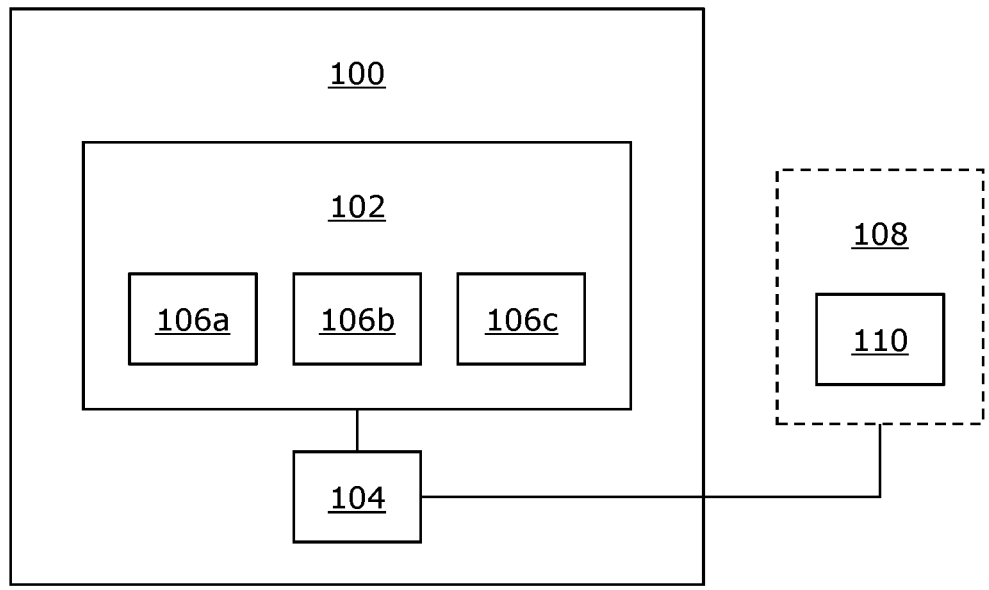
FIG. 1 illustrates a block diagram of an architecture of a system incorporating eye-directed image signal processing, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
an image sensor comprising a plurality of photo-sensitive cells; and
at least one processor configured to:
  receive, from the image sensor, a plurality of image signals captured by corresponding photo-sensitive cells of the image sensor;
  obtain information indicative of a current pupil size of a user of a display apparatus;
  determine a given luminosity range corresponding to the current pupil size; and
  selectively perform a sequence of image signal processes on the plurality of image signals and control a plurality of parameters employed for performing the sequence of image signal processes, based on the given luminosity range, to generate an image.

In a second aspect, an embodiment of the present disclosure provides a method comprising:
receiving, from an image sensor, a plurality of image signals captured by corresponding photo-sensitive cells of the image sensor;
obtaining information indicative of a current pupil size of a user of a display apparatus;
determining a given luminosity range corresponding to the current pupil size; and
selectively performing a sequence of image signal processes on the plurality of image signals and controlling a plurality of parameters employed for performing the sequence of image signal processes, based on the given luminosity range, to generate an image.

The present disclosure provides the aforementioned system and the aforementioned method incorporating eye-directed image signal processing, for generating high-quality and realistic images for the display apparatus, in a computationally-efficient and a time-efficient manner. Herein, depending on the given luminosity range, the sequence of image signal processes are selectively performed and the plurality of parameters are controlled (namely, modified or adjusted) to provide different extents of processing for the plurality of image signals when generating the image. Therefore, different image signals corresponding to different parts of the at least one image are processed differently (i.e. in a non-uniform manner). In such a case, the at least one processor selectively (i.e. customisably) performs the sequence of image signal processes and controls the plurality of parameters employed therefor in a manner that processor overburdening, delays, and excessive power consumption do not occur during processing of the plurality of image signals to generate the image. This is because at least some of the plurality of image signals would correspond to relatively darker regions or relatively brighter regions, and may require minimal processing since pixels that capture such image signals would be viewed differently by the user in the image. Furthermore, the at least one processor effectively deals with visual quality requirements of various display devices, to generate high-quality images that can be comfortably viewed by the user. The system and the method are simple, robust, support real-time and reliable eye-adaptive image signal processing, and can be implemented with ease.

Throughout the present disclosure, the term "image sensor" refers to a device that detects light from a real-world environment at the plurality of photo-sensitive cells (namely, a plurality of pixels arranged on a photo-sensitive surface of the image sensor) to capture the plurality of image signals. It is to be understood that the plurality of image signals are electrical signals pertaining to a real-world scene of the real-world environment. The plurality of image signals constitute image data of the plurality of photo-sensitive cells. Herein, the term "image data" refers to information pertaining to a given photo-sensitive cell of the image sensor, wherein said information comprises one or more of: a colour value of the given photo-sensitive cell, a depth value of the given photo-sensitive cell, a transparency value of the given photo-sensitive cell, a luminosity value of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor. Image sensors are well-known in the art.

It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the image sensor. In an example, the image sensor may comprise 25 megapixels arranged in the rectangular 2D grid (such as a 5000×5000 grid) on the photosensitive surface. In an example, for sake of simplicity and better understanding, the image sensor may comprise 10 photo-sensitive cells A1, A2, A3, A4, A5, A6, A7, A8, A9, and A10 for capturing 10 image signals B1, B2, B3, B4, B5, B6, B7, B8, B9, and B10, respectively.

Optionally, the image sensor is a part of a camera that is employed to capture image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. Optionally, the camera is implemented as a combination of the visible-light camera and the depth camera. Optionally, the camera comprises at least one of: a Bayer colour filter array (CFA), a multispectral filter, arranged in front of the plurality of photo-sensitive cells. The Bayer CFA and the multispectral filter are well-known in the art.

It will be appreciated that the camera could, for example, be arranged anywhere in the real-world environment where the user of the display apparatus is present, or could be arranged on a teleport device present in the real-world environment, or could be arranged on the display apparatus that is worn by the user on his/her head. The term "teleport device" refers to specialized equipment that is capable of facilitating virtual teleportation.

Throughout the present disclosure, the term "display apparatus" refers to a specialized equipment that is capable of at least displaying image(s). These images are to be presented to the user of the display apparatus. It will be appreciated that the term "display apparatus" encompasses a head-mounted display (HMD) device and optionally, a computing device communicably coupled to the HMD device. The term "head-mounted display" device refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. Examples of the computing device include, but are not limited to, a laptop, a desktop, a tablet, a phablet, a personal digital assistant, a workstation, and a console. The term "extended-reality" encompasses virtual reality (VR), augmented reality (AR), mixed reality (MR), and the like. The system could be integrated with the display apparatus (for example, the HMD device), or could be remotely located from the display apparatus. Optionally, (the at least one processor of) the system is communicably coupled with the display apparatus.

Notably, the at least one processor controls an overall operation of the system. The at least one processor is communicably coupled to at least the image sensor. Optionally, the at least one processor is implemented as an image signal processor. In an example, the image signal processor may be implemented as a programmable digital signal processor (DSP), or as a cloud server (namely, a remote server) that provides a cloud computing service.

Optionally, when the system is remotely located from the display apparatus, the at least one processor obtains the information indicative of the current pupil size from the display apparatus. Alternatively, optionally, when the system is integrated into the display apparatus, the at least one processor obtains the information indicative of the current pupil size from eye-tracking means of the display apparatus. It will be appreciated that the aforesaid information is obtained in real time or near-real time.

Optionally, (a processor of) the display apparatus is configured to: process eye-tracking data, collected by the eye-tracking means, to detect the current pupil size of an eye of the user; and send the information indicative of the current pupil size to the at least one processor. Herein, the term "eye-tracking means" refers to specialized equipment for detecting and/or following user's eyes, when the display apparatus (for example, the HMD device), in operation, is worn by the user. The eye-tracking means could be implemented as contact lenses with sensors, cameras monitoring a position, a size and/or a shape of a pupil of a given eye of the user, and the like. The eye-tracking means are well-known in the art.

It will be appreciated that when an image is presented to the user of the display apparatus, a pupil size of the user's eye may keep changing depending on a variation of brightness (namely, light intensity) across a visual scene represented in said image. This is due to the fact that the pupil size is naturally adjusted (namely, increased or decreased) to control an amount of light incident on the user's eye. For example, the pupil size decreases (namely, the pupil constricts) when the user views a region within the visual scene having a relatively higher brightness. On the other hand, the pupil size increases (namely, the pupil dilates) when the user views a region within the visual scene having a relatively lower brightness. Therefore, the current pupil size of the user's eye would correspond to a given time instant when the user views/gazes at a particular region within said visual scene.

It will also be appreciated that the eye-tracking data is collected repeatedly by the eye-tracking means throughout a given session of using the display apparatus, as the pupil size of the user's eye may keep changing whilst he/she uses the display apparatus. The eye-tracking data may comprise images/videos of the user's eye, sensor values, and the like. Optionally, when processing the eye-tracking data to detect the current pupil size, the processor of the display apparatus is configured to employ at least one of: an image processing algorithm, a feature extraction algorithm, a data processing algorithm. The pupil size could, for example, be expressed in terms of a number of pixels, a percentage of a constriction of the pupil with respect to its maximum size, a percentage of a dilation of the pupil with respect to its minimum size, or similar. The pupil size may be referred to as a diameter of the pupil. Also a calibration process may be employed: either pre-calibration, continuous calibration, or on-line calibration, which maps the current pupil size to a luminosity range that the eye can comfortably view. Techniques for processing the eye-tracking data to detect pupil sizes are well-known in the art.

Optionally, the current pupil size is detected for both a first eye and a second eye of the user, and then an average current pupil size is calculated and utilised for determining the given luminosity range.

Alternatively, optionally, the current pupil size is detected for both the first eye and the second eye, and the given luminosity range is determined for the first eye and the second eye individually. Yet alternatively, optionally, the current pupil size is detected for one of the first eye or the second eye, and is replicated for the another of the first eye or the second eye. In such a case, the given luminosity range may also be determined for the first eye and the second eye individually.

Throughout the present disclosure, the term "luminosity" refers to brightness of light (namely, an intensity of light) emitted by a display of the display apparatus. Greater the luminosity of the display, greater is the brightness with which said display displays an image, and vice versa. Typically, the luminosity of the display is expressed in terms of nits or candelas per square meter. For example, an a Liquid Crystal Display (LCD) monitor or a smartphone screen may have a luminosity range of 200 nits to 1000 nits. Luminosity is well-known in the art.

Notably, determining the given luminosity range means determining a lower bound (namely, a minimum luminosity value of a pixel in the image) and an upper bound (namely, a maximum luminosity value of a pixel in the image) of the given luminosity range, based on the current pupil size. In this regard, the given luminosity range would comprise a plurality of luminosity values that lie between the lower bound and the upper bound. The given luminosity range is to be employed for displaying images at the display apparatus. In an example, the given luminosity range may be 0-255, wherein 0 is the lower bound and 255 is the upper bound. In another example, the given luminosity range may be 1-200, wherein 1 is the lower bound and 200 is the upper bound. It is to be understood that the lower bound of the given luminosity range need not necessarily be zero (i.e., it could also be a near-zero value). Moreover, the lower bound would correspond to a minimum brightness represented by the given pixel, and the upper bound would correspond to a maximum brightness represented by the given pixel. Herein, the term "luminosity value" of a given pixel of an image refers to a brightness value of the given pixel. For an 8-bit image, a luminosity value of the given pixel may lie in a range of 0-255. Similarly, for a 10-bit image, a luminosity value of the given pixel may lie in a range of 0 to 1023. For a 16-bit image, a luminosity value of the given pixel may lie in a range of 0 to 65535. Luminosity values are well-known in the art. Alternatively, the image luminosity values may be represented in the range of 0 to 1 where 0 maps to the lowest possible luminosity and 1 to the highest. The brightness levels are quantized into $2^8$, $2^{10}$ or $2^{16}$ discrete levels for 8, 10 and 16-bit images, respectively.

Optionally, when determining the given luminosity range, the at least one processor is configured to employ a lookup table, wherein the lookup table comprises different luminosity ranges corresponding to different pupil sizes. Such a lookup table could be generated prior to a given session of using the system (or the display apparatus), by performing an initial calibration. In this regard, the user may be required to wear a wearable device that comprises the eye-tracking means, and to view at least one reference image displayed on a display of the wearable device, wherein the at least one reference image represents a visual scene having varying brightness. The pupil size of the user's eye is measured continuously when the user views different regions within the visual scene, and corresponding luminosity ranges that are comfortable/suitable for said viewing, are recorded for generating the lookup table. It will be appreciated that the aforesaid calibration could be performed for multiple users and an average of different luminosity ranges corresponding to different pupil sizes of the multiple users is used for generating the lookup table. Moreover, the aforesaid calibration could also be performed on-the-fly, wherein the corresponding luminosity ranges are updated based on real-time measurements of the pupil size. Optionally, the lookup table is stored at a data repository that is communicably coupled to the at least one processor. The data repository could be implemented, for example, such as a memory of the at least one processor, a memory of the display apparatus, a removable memory, a cloud-based database, or similar.

Alternatively, optionally, when determining the given luminosity range, the at least one processor is configured to employ at least one polynomial function for calculating the lower bound and/or the upper bound of the given luminosity range. In this regard, the pupil sizes and the corresponding luminosity ranges obtained during the aforesaid calibration could be utilised (by the at least one processor) for generating the at least one polynomial function. In an example, for the upper bound, the polynomial function may be a standard quadratic polynomial function $f(x)=a*x^2+b*x+c$, wherein x is the pupil size, and a, b, and c are pre-determined coefficients. It will be appreciated that other mathematical function, for example, such as an exponential function or a sigmoid function could also be employed.

The term "display" refers to an element from which light emanates. The display of the display apparatus is driven to display image(s) in real time or near-real time. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. The display could also be implemented as a projector. Displays and projectors are well-known in the art.

Notably, depending on the given luminosity range, the sequence of image signal processes are selectively performed and the plurality of parameters are controlled (namely, modified or adjusted) to provide different extents of processing for the plurality of image signals. For example, when the given luminosity range is narrower (i.e., the upper bound of the given luminosity range is relatively lower) as compared to a high dynamic range, and at least some image signals correspond to relatively darker regions or relatively brighter regions within the real-world scene of the real-world environment, some image signal processes in said sequence for said image signals can be skipped (i.e., not performed) and corresponding parameters need not be controlled. This is because since the given luminosity range defines a luminosity range within which the user's eyes can comfortably view an image, the aforesaid regions within the real-world scene need not required to be represented in the image with a high visual fidelity or using the high dynamic range, as the user would be unable to perceive any major difference in visual quality (as the aforesaid regions are already very bright or very dark), when viewing such regions in said image. Beneficially, selectively performing the sequence of image signal processes and controlling the plurality of parameters employed therefor aims to reduce a computational burden on the at least one processor during processing of the plurality of image signals. This is because at least some of the plurality of image signals would correspond to relatively darker regions or relatively brighter regions, and may require minimal processing since pixels that capture such image signals would be viewed differently by the user in the image.

It will be appreciated that the image signal processes in the sequence need not be performed by the at least one processor in any specific order or only in a fixed sequence. However, which image signal processes are to performed and which image signal processes are to be skipped in said sequence may depend on which image signals correspond to very dark regions or very bright regions in the image. Such a selection can be done based on the (determined) given luminosity range which is influenced by a physiology of the human eye, as discussed above. As the human eye perceives very dark regions and very bright regions differently, said selection potentially enhance an overall viewing experience of the user without overburdening the at least one processor. It will also be appreciated that a decision on which image signal processed are to be performed may not solely be based on technical considerations but also on artistic preferences, i.e., generating an accurate, realistic, and aesthetic-pleasing images.

Optionally, the at least one processor comprises a plurality of hardware blocks, wherein a given hardware block is configured to perform a given image signal process or a processing step of a given image signal process from amongst the sequence of image signal processes. The given image signal process has at least one processing step. Optionally, the plurality of hardware blocks are associated with separate switches, wherein a given switch activates the given hardware block to perform the given image signal process, based on the given luminosity range. Alternatively, optionally, an entirety of the plurality of hardware blocks are associated with a single switch, wherein the single switch activates the entirety of the plurality of hardware blocks to perform the sequence of image signal processes, based on the given luminosity range. Such implementations of the plurality of hardware blocks are feasible because the plurality of hardware blocks could be implemented using silicon chips, which are cheap and provide fast processing. It will be appreciated that in the at least one processor, the plurality of parameters employed for performing the sequence of image signal processes, are optionally controlled by a control module which may be a part of the at least one processor only.

Examples of the given image signal process include, but are not limited to, black level correction, defective pixel correction (DPC), Bayer domain denoising, lens shading correction, scaling, automatic white balance gain adjustment, demosaicking, automatic white balance static parameters adjustment, colour conversion matrix interpolation, autofocus, auto exposure, gamma correction, colour space conversion, luma and chroma denoising, sharpening and edge enhancement, contrast adjustment, shot noise correction, chromatic aberration correction, reprojection, cropping, and resizing. As an example, the given image signal process may be the DPC, having two processing steps that are defective pixel detection (DPD), and subsequently either noise cleaning or defective pixel cancellation. All the aforementioned image signal processes are well-known in the art.

Examples of the plurality of parameters include, but are not limited to, colour conversion matrix, colour temperature, scaling factor, shutter speed, lens aperture, pixel intensity, pixel size, an amount of shading, denoising factor, a search window, a number of colour planes or pixels to be processed, a pixel step, a pixel granularity, a number of iterations, a sigma value, a sigma space value, a sigma colour value, a number of statistical factors, a number of digits, a magnitude of a gain, a threshold value, a width of a template window, a length of a template window, a width of kernel, a length of kernel, and a number of pyramid layers. It will be appreciated that a given parameter is employed during a corresponding image signal process of the aforementioned sequence. When performing the corresponding image signal process on a given image signal, the given parameter is taken into account. All the aforementioned parameters employed for performing image signal processes are well-known in the art.

In an example, when the real-world environment has an excessively bright lighting condition, a group of photosensitive cells on the image sensor to capture such excessive light may become saturated. In such a case, shutter speed and/or lens aperture of the camera may be reduced to prevent this saturation. Furthermore, another image signal process that may be performed for image signals captured by said group is auto white balance, wherein a colour temperature of a visual scene is estimated by analysing a histogram of said group and a closest matching colour temperature of the lighting condition.

Optionally, upon generating the image, the at least one processor is configured to send the image to the display apparatus. Optionally, in this regard, (the processor of) the display apparatus is configured to employ at least one of: a tone-mapping technique, an exposure-adjustment technique, on the image to generate a display image, for displaying thereat (as discussed later).

Optionally, the at least one processor is configured to:
obtain information indicative of a gaze direction of the user of the display apparatus;
determine a gaze region of the image, based on the gaze direction; and
adjust at least one of: a lower bound, an upper bound, of the given luminosity range, based on luminosity values of pixels in the gaze region of the image.

Optionally, when the system is remotely located from the display apparatus, the at least one processor obtains the information indicative of the gaze direction from the display apparatus. Alternatively, optionally, when the system is integrated into the display apparatus, the at least one processor obtains the information indicative of the gaze direction from the eye-tracking means of the display apparatus. It will be appreciated that the aforesaid information is obtained in real time or near-real time.

The term "gaze direction" refers to a direction in which the user's eye is gazing. The gaze direction may be represented by a gaze vector. Optionally, (the processor of) the display apparatus is configured to: process the eye-tracking data, collected by the eye-tracking means, to determine the gaze direction of the user; and send the information indicative of the gaze direction to the at least one processor. Determining the gaze direction of the user's eye facilitates in tracking where the user is looking/gazing. Techniques for processing the eye-tracking data to determine the gaze direction are well-known in the art. It will be appreciated that the eye-tracking data is collected repeatedly throughout the given session of using the display apparatus, as gaze of the user's eyes keeps changing whilst he/she uses the display apparatus.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. In such a case, the change in the user's gaze could be determined in terms of a gaze velocity and/or a gaze acceleration of a given eye of the user, using information indicative of previous gaze directions of the given eye and/or the current gaze direction of the given eye. Yet alternatively, optionally, the gaze direction is a default gaze direction, wherein the default gaze direction is straight towards a centre of a field of view of the user. In this regard, it is considered that the user's gaze is, by default, typically directed towards the centre of his/her field of view. In such a case, a central region of the field of view of the user is resolved to a much greater degree of visual detail, as compared to a remaining, peripheral region of the field of view of the user.

Optionally, when determining the gaze region of the image, the at least one processor is configured to map the gaze direction of the user onto the image. The term "gaze region" refers to a region in the image onto which the gaze direction is mapped. The gaze region could, for example, be at a centre of the image, be a top-left region of the image, a bottom-right region of the image, or similar. Optionally, an angular width of the gaze region lies in a range of 5 degrees to 45 degrees. As an example, the angular width of the gaze region may be from 5, 10, 20 or 35 degrees up to 15, 30 or 45 degrees.

Once the gaze region is determined, the luminosity values of the pixels in the gaze region are utilised for fine-tuning (namely, improving) the lower bound and/or the upper bound. This is because objects lying within the gaze region (i.e., gaze-contingent objects) are focused onto foveae of user's eyes, and are resolved to a much greater detail as compared to remaining object(s) lying outside the gaze region, and therefore colour values and brightness levels of pixels representing such gaze-contingent objects should be highly accurate. Thus, the lower bound and/or the upper bound could be adjusted (i.e., fine-tuned) accordingly, in order to facilitate the at least one processor to represent such gaze-contingent objects highly realistically in the image. Beneficially, this may enhance user's viewing experience when said image is shown to the user. It is to be understood that once the lower bound and the upper bound are adjusted, then only the at least one processor selectively performs the sequence of image signal processes and controls the plurality of parameters, as discussed earlier.

Optionally, the at least one processor is configured to:
obtain information indicative of at least one of: a tone-mapping technique, an exposure-adjustment technique that is to be employed at the display apparatus; and
selectively perform the sequence of image signal processes and control the plurality of parameters, further based on the at least one of: the tone-mapping technique, the exposure-adjustment technique.

Optionally, (the processor of) the display apparatus is configured to employ the at least one of: the tone-mapping technique, the exposure-adjustment technique, to map luminosity values of pixels in the image (generated by the at least one processor of the system) to luminosity values of corresponding pixels in a display image (that is to be displayed at the display apparatus), wherein the luminosity values of the pixels in the image lie in the given luminosity range.

Once the at least one processor has knowledge pertaining to which tone-mapping technique and/or exposure adjustment technique would be employed at the display apparatus, the at least one processor could easily ascertain how much the luminosity values of the pixels in the image would vary (namely, decrease) upon performing the aforesaid mapping at the display apparatus. Therefore, some image signal processes for image signals corresponding to relatively darker regions or relatively brighter regions within the real-world scene need not be performed by the at least one processor. This is because the user would be unable to perceive any difference in visual quality when viewing the aforesaid regions in the image even when a low dynamic range of luminosity values is used for the aforesaid mapping, as these regions are already very bright or very dark due to a current accommodation status of the user's eye and the given luminosity range. Beneficially, this potentially facilitates in saving computational resources and processing time of the at least one processor, without compromising on resulting visual quality achieved in the display image that is to be displayed at the display apparatus. Moreover, this may also facilitate in improving (namely, increasing) a frame rate of displaying display images at the display apparatus, as delays due to certain image signal processes (that are skipped) would not occur.

It will be appreciated that the information indicative of the at least one of: the tone-mapping technique, the exposure-adjustment technique, could be pre-stored at the data repository, and the at least one processor is configured to obtain said information from the data repository, as and when required. Alternatively, optionally, the at least one processor is configured to obtain said information directly from the display apparatus itself. Said information is obtained in real time or near-real time. The "tone-mapping technique" is an image processing technique used to convert a high dynamic range image into an image that can be displayed on a display having a standard/low dynamic range. The "exposure adjustment technique" is an image processing technique used to control (namely, increase or decrease) an overall brightness of an image, by adjusting exposure settings of said image or by adjusting luminosity values of pixels in said image. Upon performing the exposure adjustment technique, said image would appear to have a balanced level of brightness and contrast. The tone-mapping technique and/or the exposure-adjustment technique may employ a mapping function for performing the aforesaid mapping. Such a mapping function could, for example, be a Reinhard operator, a Mantiuk operator, or similar. In some cases, the tone-mapping technique may implement the exposure adjustment technique implicitly, while in others cases the tone-mapping technique and the exposure adjustment technique are performed separately (for example, the exposure adjustment technique is performed prior to employing the tone-mapping technique), along with employing other techniques such as a colour grading technique at the display apparatus. The tone-mapping technique and the exposure-adjustment technique are well-known in the art.

Optionally, the at least one processor is configured to determine a maximum luminosity value that is mapped to a luminosity value that lies within a predefined range from a lower bound of the given luminosity range by the at least one of: the tone-mapping technique, the exposure-adjustment technique, wherein, when selectively performing the sequence of image signal processes, the at least one processor is configured to skip at least one of: denoising, gamma correction, black level correction, defective pixel correction, lens shading correction, contrast adjustment, shot noise correction, sharpening, edge enhancement, demosaicking, on a given region of the image in which luminosity values of pixels is lower than or equal to the maximum luminosity value.

In this regard, when the given region of the image in which the luminosity values of the pixels is lower than or equal to the maximum luminosity value, the given region of the image is considered to be significantly dark, and the user would already perceive the given region as extremely dark, given the current pupil size and a status of an eye accommodation of the user. Therefore, performing at least one of the aforementioned image signal processes on the given region would not be beneficial, as enhancing already extremely dark region(s) in the image is unnecessary and a waste of computational resources and processing time of the at least one processor. Thus, the at least one processor skips (i.e., do not perform) at least one of the aforementioned image signal process, when processing the plurality of image signals.

It will be appreciated that the maximum luminosity value is to be understood to be a maximum possible luminosity value of a pixel to be classified as belonging to a considerably dark region in the image. Thus, all pixels whose luminosity values are less than or equal to said maximum possible luminosity value, could be classified as belonging to the considerably dark region in the image. Further, when determining the maximum luminosity value, the at least one processor may ascertain how the luminosity values of pixels in the image (generated by the at least one processor) would be mapped to the luminosity values of corresponding pixels in the display image (as discussed earlier). The maximum luminosity value (of a pixel in the image) would map to the luminosity value (of a pixel in the display image) that lies within the predefined range corresponding to the considerably dark region in the image. For example, in case of an 8-bit representation, '0' represents pure black (no light) and '255' represents pure white (maximum light). In such a case, the maximum luminosity value may be mapped to a luminosity value that lies in a range of 5 to 50, depending on the tone-mapping technique and/or the exposure-adjustment technique employed at the display apparatus for the aforesaid mapping. The predefined range takes care of non-zero luminosity values of pixel that correspond to the considerably dark region in the image (for example, such as dark or very dark shadows in the image). It is to be understood that the given region of the image is considered to be significantly dark, for example, when a luminosity value of a pixel of the given region is near zero (i.e., when the given region is almost or completely devoid of light and appear as a darkest portion of the image) or when a luminosity value of the pixel of the given region is ranging from very close to 0 up to, for example, such as around 50, wherein such a pixel may contain some minimal visual detail but is still dark.

Optionally, the at least one processor is configured to:
determine a maximum luminosity value that is mapped to
a luminosity value that lies within a predefined range
from a lower bound of the given luminosity range by
the at least one of: the tone-mapping technique, the
exposure-adjustment technique;
obtain information indicative of a gaze direction of the
user of the display apparatus; and
determine a gaze region of the image, based on the gaze
direction,
wherein, when selectively performing the sequence of image signal processes, the at least one processor is configured to skip denoising on a given part of the gaze region of the image in which luminosity values of pixels is lower than or equal to a first luminosity value, the first luminosity value being higher than the maximum luminosity value by a predefined percent.

In this regard, when the given part of the gaze region is considerably dark, the at least one processor need not perform the denoising on the given part of the gaze region in which the luminosity values of the pixels is lower than or equal to the first luminosity value. The first luminosity value could even be higher than the maximum luminosity value because the given part of the gaze region is considerably dark, and noise is generally imperceptible (namely, unnoticeable) in the gaze region of the image, as compared to a peripheral region of the image, the peripheral region surrounding the gaze region. For example, at the display apparatus, during mapping dark colours to black colour may be crunched altogether such that the denoising would have no visible effect anyway. Advantageously, not performing the denoising in the given part of the gaze region potentially facilitates in reducing a computational burden and processing time of the at least one processor (during processing of the plurality of image signals), as performing the denoising would just be a waste of processing resources and processing time of the at least one processor. Even when the denoising is not performed in the given part of the gaze region, visual quality (for example, in terms of a resolution, colour reproduction, a contrast, a brightness, and the like) of said part would still be high. It will be appreciated that a noise profile that could be noticed (namely, perceived) by the user and a noise profile that could not be noticed by the user may be different in the gaze region and the peripheral region of the image.

Optionally, the predefined percent lies in a range of 5 percent to 20 percent. In an example, when the maximum luminosity value may be 50 (for example, in case of an 8-bit representation) and the predefined percent may be 10 percent, the first luminosity value is 55. This means, for any pixel in the gaze region whose luminosity value is lower than or equal to 55, the denoising operation is not performed by the at least one processor. Determination of the maximum luminosity value and determination of the gaze region based on the gaze direction have already been discussed earlier in detail. Optionally, when selectively performing the sequence of image signal processes, the at least one processor is configured to also skip some image signal processes on a given part of the peripheral region of the image.

Optionally, the at least one processor is configured to determine a minimum luminosity value that is mapped to a luminosity value that lies within a predefined range from an upper bound of the given luminosity range by the at least one of: the tone-mapping technique, the exposure-adjustment technique, wherein, when selectively performing the sequence of image signal processes, the at least one processor is configured to skip at least one of: denoising, gamma correction, defective pixel correction, lens shading correction, contrast adjustment, shot noise correction, sharpening, edge enhancement, demosaicking, on a given region of the image in which luminosity values of the pixels is higher than or equal to the minimum luminosity value.

In this regard, when the given region of the image in which the luminosity values of the pixels is higher than or equal to the minimum luminosity value, the given region of the image is considered to be significantly bright, and the user would already perceive the given region as extremely bright, given the current pupil size and a status of an eye accommodation of the user. Therefore, performing at least one of the aforementioned image signal processes on the given region would not be beneficial, as enhancing already extremely bright region(s) in the image is unnecessary and a waste of computational resources and processing time of the at least one processor. Thus, the at least one processor skips (i.e., do not perform) at least one of the aforementioned image signal process, when processing the plurality of image signals.

It will be appreciated that the minimum luminosity value is to be understood to be a minimum possible luminosity value of a pixel to be classified as belonging to a considerably bright region in the image. Thus, all pixels whose luminosity values are greater than or equal to said minimum possible luminosity value, could be classified as belonging to the considerably bright region in the image (i.e., pixels that are approaching full brightness). Further, when determining the minimum luminosity value, the at least one processor may ascertain how the luminosity values of pixels in the image (generated by the at least one processor) would be mapped to the luminosity values of corresponding pixels in the display image (as discussed earlier). The minimum luminosity value (of a pixel in the image) would map to the luminosity value (of a pixel in the display image) that lies within the predefined range corresponding to the considerably bright region in the image. For example, in case of an 8-bit representation, '0' (i.e., the lower bound) represents pure black (no light/brightness) and '255' (i.e., the upper bound) represents pure white (maximum light/brightness). In such a case, the minimum luminosity value may be mapped to a luminosity value that lies in a range of 50 from 255, depending on the tone-mapping technique and/or the exposure-adjustment technique employed at the display apparatus for the aforesaid mapping. The predefined range takes care of non-zero luminosity values of pixels that correspond to the considerably bright region in the image (for example, such as those representing bright or very bright objects in the image).

It will also be appreciated that the black level correction would be only performed for the given region of the image in which the luminosity values of the pixels is lower than or equal to the maximum luminosity value (namely, when the given region is considered to be significantly dark). However, when the given region is considered to be significantly bright (as discussed hereinabove), the black level correction need not be performed by the at least one processor.

Optionally, the at least one processor is configured to:
determine a minimum luminosity value that is mapped to a luminosity value that lies within a predefined range from an upper bound of the given luminosity range by the at least one of: the tone-mapping technique, the exposure-adjustment technique;
obtain information indicative of a gaze direction of the user of the display apparatus; and
determine a gaze region of the image, based on the gaze direction,
wherein, when selectively performing the sequence of image signal processes, the at least one processor is configured to skip denoising on a given part of the gaze region of the image in which luminosity values of pixels is higher than or equal to a second luminosity value, the second luminosity value being lower than the minimum luminosity value by a predefined percent.

In this regard, when the given part of the gaze region is considerably bright, the at least one processor need not perform the denoising on the given part of the gaze region in which the luminosity values of the pixels is higher than or equal to the second luminosity value. The second luminosity value could even be lower than the minimum luminosity value because the given part of the gaze region is considerably bright, and noise is generally imperceptible (namely, unnoticeable) in the gaze region of the image, as compared to the peripheral region of the image. Advantageously, not performing the denoising in the given part of the gaze region potentially facilitates in reducing a computational burden and processing time of the at least one processor (during processing of the plurality of image signals), as performing the denoising would just be a waste of processing resources and processing time of the at least one processor. Even when the denoising is not performed in the given part of the gaze region, visual quality of said part would still be high.

Optionally, the predefined percent lies in a range of 5 percent to 20 percent. In an example, when the minimum luminosity value may be 50 (for example, in case of an 8-bit representation) and the predefined percent may be 10 percent, the second luminosity value is 45. This means, for any pixel in the gaze region whose luminosity value is higher than or equal to 45, the denoising operation is not performed by the at least one processor. Determination of the minimum luminosity value and determination of the gaze region based on the gaze direction have already been discussed earlier in detail.

Optionally, when selectively performing the sequence of image signal processes, the at least one processor is configured to:
perform white balancing based on a target colour temperature that is to be employed at the display apparatus, when the target colour temperature is known; and
skip white balancing, when the target colour temperature is not known.

The "white balancing" is an image processing technique that is used for adjusting colour values in an image in a manner that said image appears perceptually neutral, particularly with respect to a white colour reference. In other words, the white balancing involves modifying the colour values (such as RGB colour values) in the image to compensate for a target colour temperature that is to be employed at the display apparatus, thereby removing unwanted colour casts introduced by varying lighting conditions. Thus, it could be ensured that objects or their portions that should appear white in said image are actually rendered as such in said image. Techniques for performing the white balancing are well-known in the art.

It will be appreciated that only when the target colour temperature is known, the white balancing is performed effectively as the target colour temperature provides a reference point for correcting the colour values in the image accordingly. This is because the target colour temperature defines how a white object or its portion should appear in the image in a particular lighting condition; and without the target colour temperature, it would be difficult to accurately adjust the colour values to remove unwanted colour casts in the image. In an example, the display of the display apparatus may have a standardised colour space with a white point such as D65 for sRGB colour space, and a target colour temperature such as 6500 Kelvin for the sRGB colour space. The technical benefit of performing the white balancing is that it facilitates in maintaining colour fidelity and consistency in visual content represented by the image. It may also potentially help in reducing eye strain and discomfort for the user, which may enhance user's viewing experience. It will also be appreciated that when the target colour temperature is not known, the white balancing is not performed. Beneficially, this potentially facilitates in saving computational resources, processing time of the at least one processor, and in reducing delays at the at least one processor.

Optionally, the at least one processor is configured to obtain information indicative of a colour space used by a display of the display apparatus, wherein, when selectively performing the sequence of image signal processes, the at least one processor is configured to perform colour conversion based on the colour space used by the display of the display apparatus.

It will be appreciated that the information indicative of the colour space used by the display could be pre-stored at the data repository, and the at least one processor is configured to obtain said information from the data repository, as and when required. Alternatively, optionally, the at least one processor is configured to obtain said information directly from the display apparatus itself. Said information is obtained in real time or near-real time. Optionally, the colour space used by the display is one of: a standard Red-Green-Blue (sRGB) colour space, an RGB colour space, a Luminance and two colour differences (YUV) colour space, a Hue-Chroma-Luminance (HCL) colour space, a Hue-Saturation-Lightness (HSL) colour space, a Hue-Saturation-Brightness (HSB) colour space, a Hue-Saturation-Value (HSV) colour space, a Hue-Saturation-Intensity (HSI) colour space, a Cyan-Magenta-Yellow-Black (CMYK) colour space, a blue-difference and red-difference chroma components (YCbCr) colour space. Colour spaces and their types are well-known in the art.

Once the information indicative of the colour space is known, the at least one processor is configured to perform the colour conversion, wherein colour values of the plurality of image signals in a given colour space (namely, an existing/current colour space) are converted (namely, translated) to colour values of the plurality of image signals in the colour space that is used by the display. This may be beneficial, for example, when the colour values of the plurality of image signals may belong to the RGB colour space, and the colour space that is used by the display is the sRGB colour space. It will be appreciated that performing such a colour conversion facilitates in accurate and realistic colour reproduction and in improving colour fidelity in the display image that is to be displayed at the display apparatus upon performing the aforesaid mapping (as discussed earlier). This may potentially enhance user's viewing experience when said display image is shown to the user. This may also enable in reducing noise and avoid repeating back and forth colour space conversions. Optionally, when performing the colour conversion, the at least one processor is configured to employ a colour conversion matrix. In this regard, coefficients in said colour conversion matrix are multiplied by the colour values of the plurality of image signals in the given colour space to yield the colour values of the plurality of image signals in the colour space that is used by the display. These colour values are then utilized to generate the display image. The colour conversion matrix could also be employed to enhance memory colours. Techniques for performing the colour conversion using colour conversion matrices are well-known in the art.

Optionally, the at least one processor is configured to:
determine, based on the given luminosity range, at least two different settings pertaining to at least one of: an exposure time, a sensitivity, an aperture size; and
control the image sensor to capture the plurality of image signals by utilising the at least two different settings.

In this regard, the plurality of image signals are captured using at least one of: different exposure times, different sensitivities, different aperture sizes. Beneficially, utilising the at least two different settings for capturing the plurality of image signals facilitates in subsequently generating high dynamic range (HDR) images. In order to determine the at least two different settings, an overall brightness in a visual scene for which the plurality of image signals are to be captured, is determined by using the given luminosity range. For example, when the given luminosity range is wide i.e., the upper bound of the given luminosity range indicates a considerably high luminosity value, it may be ascertained that the brightness in the visual scene is significantly high (i.e., the visual scene is too bright). Similarly, when the given luminosity range is narrow i.e., the upper bound of the given luminosity range indicates a considerably low luminosity value, it may be ascertained that the brightness of the visual scene is significantly less (i.e., the visual scene is too dark). In such a scenario, when the visual scene is too bright, the at least one processor may utilise a short (i.e., faster) exposure time for capturing a given image signal, whereas when the visual scene is too dark, the at least one processor may utilise a long (i.e., slower) exposure time for capturing a given image signal. Further, when the visual scene is too bright, the at least one processor may utilise a low sensitivity setting (i.e., a low ISO level) for capturing a given image signal, whereas when the visual scene is too dark, the at least one processor may utilise a high sensitivity setting (i.e., a high ISO level) for capturing a given image signal. Moreover, when the visual scene is too bright, the at least one processor may utilise a narrow aperture size (i.e., a high F-number) for capturing a given image signal, whereas when the visual scene is too dark, the at least one processor may utilise a wide aperture size (i.e., a low F-number) for capturing a given image signal.

Herein, the term "exposure time" refers to a time span for which a photo-sensitive surface of the image sensor is exposed to light, so as to capture a given image signal. Furthermore, the term "sensitivity" refers to a measure of how strongly the photo-sensitive surface of the image sensor responds when exposed to the light, so as to capture a given image signal. Greater the sensitivity of the image sensor, lesser is an amount of light required to capture the given image signal, and vice versa. Typically, the sensitivity of the camera is expressed in terms of ISO levels, for example, such as lying in a range of ISO 100 to ISO 6400. It will be appreciated that different sensitivities could be obtained by the camera by changing (namely, altering) analog gain and/or digital gain of the camera. Techniques and algorithms for changing the analog gain and/or the digital gain of the camera (in image signal processing) are well-known in the art. Moreover, the term "aperture size" refers to a size of an opening present in the camera through which the light emanating from the real-world environment enters said camera, and reaches the photo-sensitive surface of the image sensor. The aperture size is adjusted to control an amount of light that is allowed to enter the camera, when capturing an image of the real-world scene of the real-world environment. Typically, the aperture size of the camera is expressed in an F-number format. Larger the aperture size, smaller is the F-number used for capturing images, and narrower is the depth-of-field captured in the images. Conversely, smaller the aperture size, greater is the F-number used for capturing images, and wider is the depth-of-field captured in the images. The F-number could, for example, be F/1.0, F/1.2, F/1.4, F/2.0, F/2.8, F/4.0, F/5.6, F/8.0, F/11.0, F/16.0, F/22.0, F/32.0, and the like. Aperture sizes and their associated F-numbers are well-known in art.

The present disclosure also relates to the method as described above. Various embodiments and variants disclosed above, with respect to the aforementioned system, apply mutatis mutandis to the method.

Optionally, the method further comprises:
obtaining information indicative of a gaze direction of the user of the display apparatus;
determining a gaze region of the image, based on the gaze direction; and
adjusting at least one of: a lower bound, an upper bound, of the given luminosity range, based on luminosity values of pixels in the gaze region of the image.

Optionally, the method further comprises:
obtaining information indicative of at least one of: a tone-mapping technique, an exposure-adjustment technique that is to be employed at the display apparatus; and
selectively performing the sequence of image signal processes and controlling the plurality of parameters, further based on the at least one of: the tone-mapping technique, the exposure-adjustment technique.

Optionally, the method further comprises determining a maximum luminosity value that is mapped to a luminosity value that lies within a predefined range from a lower bound of the given luminosity range by the at least one of: the tone-mapping technique, the exposure-adjustment technique,
wherein the step of selectively performing the sequence of image signal processes comprises skipping at least one of: denoising, gamma correction, black level correction, defective pixel correction, lens shading correction, contrast adjustment, shot noise correction, sharpening, edge enhancement, demosaicking, on a given region of the image in which luminosity values of pixels is lower than or equal to the maximum luminosity value.

Optionally, the method further comprises:
determining a maximum luminosity value that is mapped to a luminosity value that lies within a predefined range from a lower bound of the given luminosity range by the at least one of: the tone-mapping technique, the exposure-adjustment technique;
obtaining information indicative of a gaze direction of the user of the display apparatus; and
determining a gaze region of the image, based on the gaze direction,
wherein the step of selectively performing the sequence of image signal processes comprises skipping denoising on a given part of the gaze region of the image in which luminosity values of pixels is lower than or equal to a first luminosity value, the first luminosity value being higher than the maximum luminosity value by a predefined percent.

Optionally, the method further comprises determining a minimum luminosity value that is mapped to a luminosity value that lies within a predefined range from an upper bound of the given luminosity range by the at least one of: the tone-mapping technique, the exposure-adjustment technique,
wherein the step of selectively performing the sequence of image signal processes comprises skipping at least one of: denoising, gamma correction, defective pixel correction, lens shading correction, contrast adjustment, shot noise correction, sharpening, edge enhancement, demosaicking, on a given region of the image in which luminosity values of pixels is higher than or equal to the minimum luminosity value.

Optionally, the method further comprises:
determining a minimum luminosity value that is mapped to a luminosity value that lies within a predefined range from an upper bound of the given luminosity range by the at least one of: the tone-mapping technique, the exposure-adjustment technique;
obtaining information indicative of a gaze direction of the user of the display apparatus; and
determining a gaze region of the image, based on the gaze direction,
wherein the step of selectively performing the sequence of image signal processes comprises skipping denoising on a given part of the gaze region of the image in which luminosity values of pixels is higher than or equal to a second luminosity value, the second luminosity value being lower than the minimum luminosity value by a predefined percent.

Optionally, in the method, the step of selectively performing the sequence of image signal processes comprises:
performing white balancing based on a target colour temperature that is to be employed at the display apparatus, when the target colour temperature is known; and
skipping white balancing, when the target colour temperature is not known.

Optionally, the method further comprises obtaining information indicative of a colour space used by a display of the display apparatus,
wherein the step of selectively performing the sequence of image signal processes comprises performing colour conversion based on the colour space used by the display of the display apparatus.

Optionally, the method further comprises:
determining, based on the given luminosity range, at least two different settings pertaining to at least one of: an exposure time, a sensitivity, an aperture size; and controlling the image sensor to capture the plurality of image signals by utilising the at least two different settings.

DETAILED DESCRIPTION OF THE DRAWINGS

Referring to FIG. 1, illustrated is a block diagram of an architecture of a system 100 incorporating eye-directed image signal processing, in accordance with an embodiment of the present disclosure. The system 100 comprises an image sensor 102 and at least one processor (for example, depicted as a processor 104). The image sensor 102 comprises a plurality of photo-sensitive cells (for example, depicted as three photo-sensitive cells 106a, 106b, and 106c, for sake of simplicity and clarity). The processor 104 is communicably coupled to the image sensor 102 and to a display apparatus 108. The display apparatus 108 optionally comprises a display 110. The processor 104 is configured to perform various operations, as described earlier with respect to the aforementioned first aspect.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of image sensors, processors, display apparatuses, and displays. The person skilled in the art will recognize many variations, alternatives, and modifications of embodiments of the present disclosure.

Figure 2:
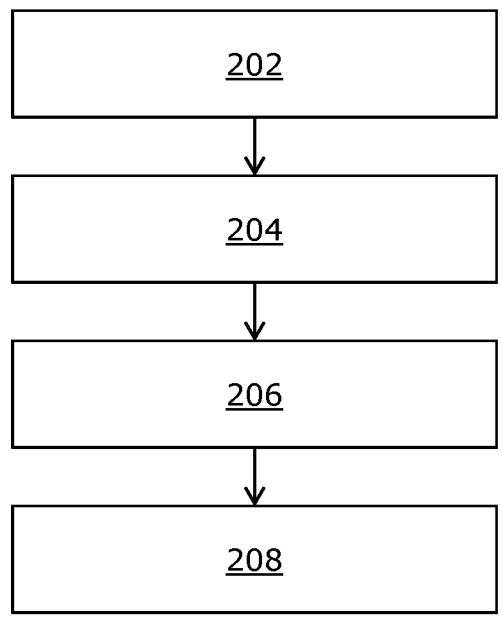
FIG. 2 illustrates steps of a method incorporating eye-directed image signal processing, in accordance with an embodiment of the present disclosure.

Referring to FIG. 2, illustrated are steps of a method incorporating eye-directed image signal processing, in accordance with an embodiment of the present disclosure. At step 202, a plurality of image signals are received from an image sensor, the plurality of image signals being captured by corresponding photo-sensitive cells of the image sensor. At step 204, information indicative of a current pupil size of a user of a display apparatus is obtained. At step 206, a given luminosity range corresponding to the current pupil size is determined. At step 208, a sequence of image signal processes is selectively performed on the plurality of image signals and a plurality of parameters employed for performing the sequence of image signal processes are controlled, based on the given luminosity range, to generate an image.

The aforementioned steps are only illustrative and other alternatives can also be provided where one or more steps are added, one or more steps are removed, or one or more steps are provided in a different sequence without departing from the scope of the claims.

Figure 3:
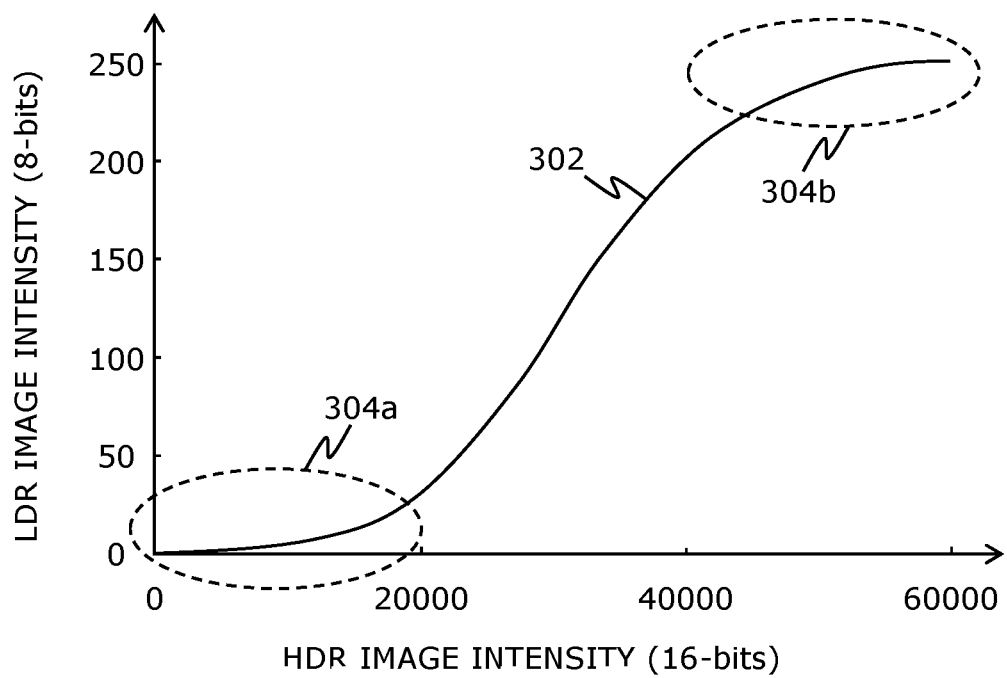
FIG. 3 illustrates an exemplary tone mapping curve representing a non-linear mapping of luminosity values of pixels in a high dynamic range (HDR) image to luminosity values of corresponding pixels in a low dynamic range (LDR) image, in accordance with an embodiment of the present disclosure.

Referring to FIG. 3, illustrated is an exemplary tone mapping curve 302 representing a non-linear mapping of luminosity values of pixels in a high dynamic range (HDR) image to luminosity values of corresponding pixels in a low dynamic range (LDR) image, in accordance with an embodiment of the present disclosure. Herein, the HDR image is considered to be a 16-bit image, whereas the LDR image is considered to be an 8-bit image. The tone mapping curve 302 has an "S" shape. The non-linear mapping is performed in a manner that the luminosity values of the pixels in the HDR image are compressed to fit into a low dynamic range (namely, a narrower luminosity range) of the LDR image, while preserving visual details of both shadows (namely, darker areas) and highlights (namely, brighter areas) in the LDR image. In other words, the tone mapping curve 302 starts with a first slope (for example, depicted using a dashed closed loop 304a) indicating considerably dark regions in the HDR image and the LDR image. A middle portion of the tone mapping curve 302 forms an S shape, indicating a gradually compression of luminosity values of pixels in mid-tone regions, retaining visual details and contrast in the LDR image. The tone mapping curve 302 ends with a second slope (for example, depicted using a dashed closed loop 304b) indicating considerably bright regions in the HDR image and the LDR image. It will be appreciated that a sequence of image signal processes on image signals corresponding to said dark regions and said bright regions is selectively performed based on a given luminosity range (that is determined corresponding to a current pupil size of a user). For example, for generating the LDR image, image signal processes such as denoising, gamma correction, defective pixel correction, lens shading correction, contrast adjustment, shot noise correction, or similar would have no/minimal impact on highly compressed luminosity value ranges at the first slope 304a and at the second slope 304b of the tone mapping curve 302. In addition to this, a plurality of parameters employed for performing said sequence are controlled accordingly, based on the given luminosity range. Such a tone mapping curve is well-known in the art.

FIG. 3 is merely an example, which should not unduly limit the scope of the claims herein. The person skilled in the art will recognize many variations, alternatives, and modifications of embodiments of the present disclosure.

The invention claimed is:

1. A system comprising:
an image sensor comprising a plurality of photo-sensitive cells; and
at least one processor configured to:
receive, from the image sensor, a plurality of image signals captured by corresponding photo-sensitive cells of the image sensor;
obtain information indicative of a current pupil size of a user of a display apparatus;
determine a given luminosity range corresponding to the current pupil size; and
selectively perform a sequence of image signal processes on the plurality of image signals and control a plurality of parameters employed for performing the sequence of image signal processes, based on the given luminosity range, to generate an image.

2. The system of claim 1, wherein the at least one processor is configured to:
obtain information indicative of a gaze direction of the user of the display apparatus;
determine a gaze region of the image, based on the gaze direction; and
adjust at least one of: a lower bound, an upper bound, of the given luminosity range, based on luminosity values of pixels in the gaze region of the image.

3. The system of claim 1, wherein the at least one processor is configured to:
obtain information indicative of at least one of: a tone-mapping technique, an exposure-adjustment technique that is to be employed at the display apparatus; and
selectively perform the sequence of image signal processes and control the plurality of parameters, further based on the at least one of: the tone-mapping technique, the exposure-adjustment technique.

4. The system of claim 3, wherein the at least one processor is configured to determine a maximum luminosity value that is mapped to a luminosity value that lies within a predefined range from a lower bound of the given luminosity range by the at least one of: the tone-mapping technique, the exposure-adjustment technique, wherein, when selectively performing the sequence of image signal processes, the at least one processor is configured to skip at least one of: denoising, gamma correction, black level correction, defective pixel correction, lens shading correction, contrast adjustment, shot noise correction, sharpening, edge enhancement, demosaicking, on a given region of the image in which luminosity values of pixels is lower than or equal to the maximum luminosity value.

5. The system of claim 3, wherein the at least one processor is configured to:
determine a maximum luminosity value that is mapped to a luminosity value that lies within a predefined range from a lower bound of the given luminosity range by the at least one of: the tone-mapping technique, the exposure-adjustment technique;
obtain information indicative of a gaze direction of the user of the display apparatus; and
determine a gaze region of the image, based on the gaze direction,
wherein, when selectively performing the sequence of image signal processes, the at least one processor is configured to skip denoising on a given part of the gaze region of the image in which luminosity values of pixels is lower than or equal to a first luminosity value, the first luminosity value being higher than the maximum luminosity value by a predefined percent.

6. The system of claim 3, wherein the at least one processor is configured to determine a minimum luminosity value that is mapped to a luminosity value that lies within a predefined range from an upper bound of the given luminosity range by the at least one of: the tone-mapping technique, the exposure-adjustment technique,
wherein, when selectively performing the sequence of image signal processes, the at least one processor is configured to skip at least one of: denoising, gamma correction, defective pixel correction, lens shading correction, contrast adjustment, shot noise correction, sharpening, edge enhancement, demosaicking, on a given region of the image in which luminosity values of pixels is higher than or equal to the minimum luminosity value.

7. The system of claim 3, wherein the at least one processor is configured to:
determine a minimum luminosity value that is mapped to a luminosity value that lies within a predefined range from an upper bound of the given luminosity range by the at least one of: the tone-mapping technique, the exposure-adjustment technique;
obtain information indicative of a gaze direction of the user of the display apparatus; and
determine a gaze region of the image, based on the gaze direction,
wherein, when selectively performing the sequence of image signal processes, the at least one processor is configured to skip denoising on a given part of the gaze region of the image in which luminosity values of pixels is higher than or equal to a second luminosity value, the second luminosity value being lower than the minimum luminosity value by a predefined percent.

8. The system of claim 1, wherein when selectively performing the sequence of image signal processes, the at least one processor is configured to:
perform white balancing based on a target colour temperature that is to be employed at the display apparatus, when the target colour temperature is known; and
skip white balancing, when the target colour temperature is not known.

9. The system of claim 1, wherein the at least one processor is configured to obtain information indicative of a colour space used by a display of the display apparatus,
wherein, when selectively performing the sequence of image signal processes, the at least one processor is configured to perform colour conversion further based on the colour space used by the display of the display apparatus.

10. The system of claim 1, wherein the at least one processor is configured to:
determine, based on the given luminosity range, at least two different settings pertaining to at least one of: an exposure time, a sensitivity, an aperture size; and
control the image sensor to capture the plurality of image signals by utilising the at least two different settings.

11. A method comprising:
receiving, from an image sensor, a plurality of image signals captured by corresponding photo-sensitive cells of the image sensor;
obtaining information indicative of a current pupil size of a user of a display apparatus;
determining a given luminosity range corresponding to the current pupil size; and
selectively performing a sequence of image signal processes on the plurality of image signals and controlling a plurality of parameters employed for performing the sequence of image signal processes, based on the given luminosity range, to generate an image.

12. The method of claim 11, further comprising:
obtaining information indicative of a gaze direction of the user of the display apparatus;
determining a gaze region of the image, based on the gaze direction; and
adjusting at least one of: a lower bound, an upper bound, of the given luminosity range, based on luminosity values of pixels in the gaze region of the image.

13. The method of claim 11, further comprising:
obtaining information indicative of at least one of: a tone-mapping technique, an exposure-adjustment technique that is to be employed at the display apparatus; and
selectively performing the sequence of image signal processes and controlling the plurality of parameters, further based on the at least one of: the tone-mapping technique, the exposure-adjustment technique.

14. The method of claim 13, further comprising determining a maximum luminosity value that is mapped to a luminosity value that lies within a predefined range from a lower bound of the given luminosity range by the at least one of: the tone-mapping technique, the exposure-adjustment technique,
wherein the step of selectively performing the sequence of image signal processes comprises skipping at least one of: denoising, gamma correction, black level correction, defective pixel correction, lens shading correction, contrast adjustment, shot noise correction, sharpening, edge enhancement, demosaicking, on a given region of the image in which luminosity values of pixels is lower than or equal to the maximum luminosity value.

15. The method of claim 13, further comprising:
determining a maximum luminosity value that is mapped to a luminosity value that lies within a predefined range from a lower bound of the given luminosity range by the at least one of: the tone-mapping technique, the exposure-adjustment technique;

obtaining information indicative of a gaze direction of the user of the display apparatus; and determining a gaze region of the image, based on the gaze direction, wherein the step of selectively performing the sequence of image signal processes comprises skipping denoising on a given part of the gaze region of the image in which luminosity values of pixels is lower than or equal to a first luminosity value, the first luminosity value being higher than the maximum luminosity value by a predefined percent.

16. The method of claim 13, further comprising determining a minimum luminosity value that is mapped to a luminosity value that lies within a predefined range from an upper bound of the given luminosity range by the at least one of: the tone-mapping technique, the exposure-adjustment technique, wherein the step of selectively performing the sequence of image signal processes comprises skipping at least one of: denoising, gamma correction, defective pixel correction, lens shading correction, contrast adjustment, shot noise correction, sharpening, edge enhancement, demosaicking, on a given region of the image in which luminosity values of pixels is higher than or equal to the minimum luminosity value.

17. The method of claim 13, further comprising:

determining a minimum luminosity value that is mapped to a luminosity value that lies within a predefined range from an upper bound of the given luminosity range by the at least one of: the tone-mapping technique, the exposure-adjustment technique;

obtaining information indicative of a gaze direction of the user of the display apparatus; and determining a gaze region of the image, based on the gaze direction, wherein the step of selectively performing the sequence of image signal processes comprises skipping denoising on a given part of the gaze region of the image in which luminosity values of pixels is higher than or equal to a second luminosity value, the second luminosity value being lower than the minimum luminosity value by a predefined percent.

18. The method of claim 11, wherein the step of selectively performing the sequence of image signal processes comprises:

performing white balancing based on a target colour temperature that is to be employed at the display apparatus, when the target colour temperature is known; and skipping white balancing, when the target colour temperature is not known.

19. The method of claim 11, further comprising obtaining information indicative of a colour space used by a display of the display apparatus, wherein the step of selectively performing the sequence of image signal processes comprises performing colour conversion based on the colour space used by the display of the display apparatus.

20. The method of claim 11, further comprising:

determining, based on the given luminosity range, at least two different settings pertaining to at least one of: an exposure time, a sensitivity, an aperture size; and controlling the image sensor to capture the plurality of image signals by utilising the at least two different settings.

* * * * *